Nov. 6, 1923. 1,472,977
W. HALLIWELL
WORK ROTATING GEAR ADAPTED FOR USE IN CONNECTION WITH HYDRAULIC
PRESSES, STEAM HAMMERS, AND THE LIKE
Filed Dec. 27, 1919 7 Sheets-Sheet 1
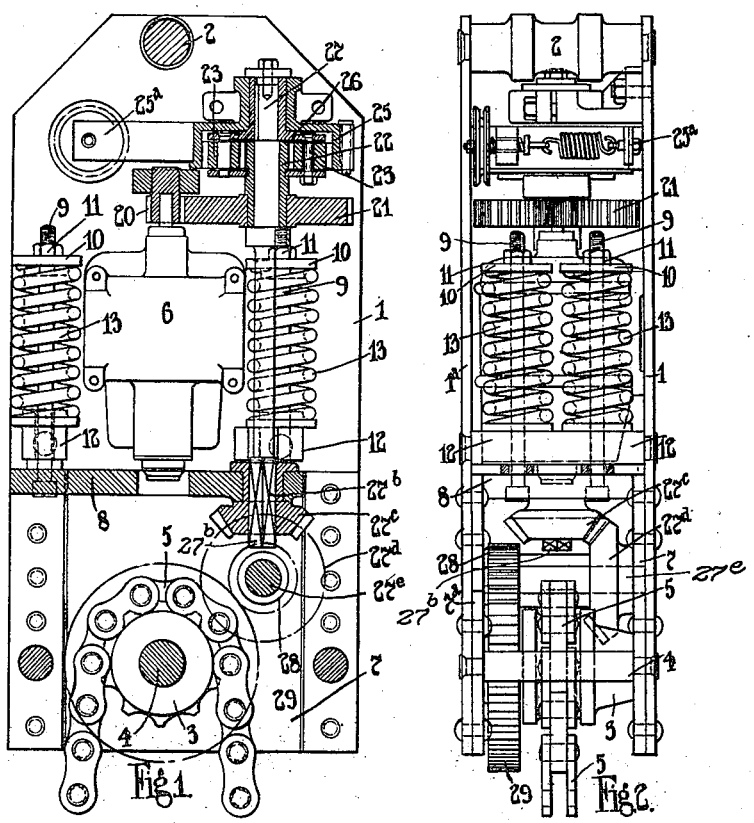
Inventor
W. Halliwell
By H. R. Kerslake
Attorney

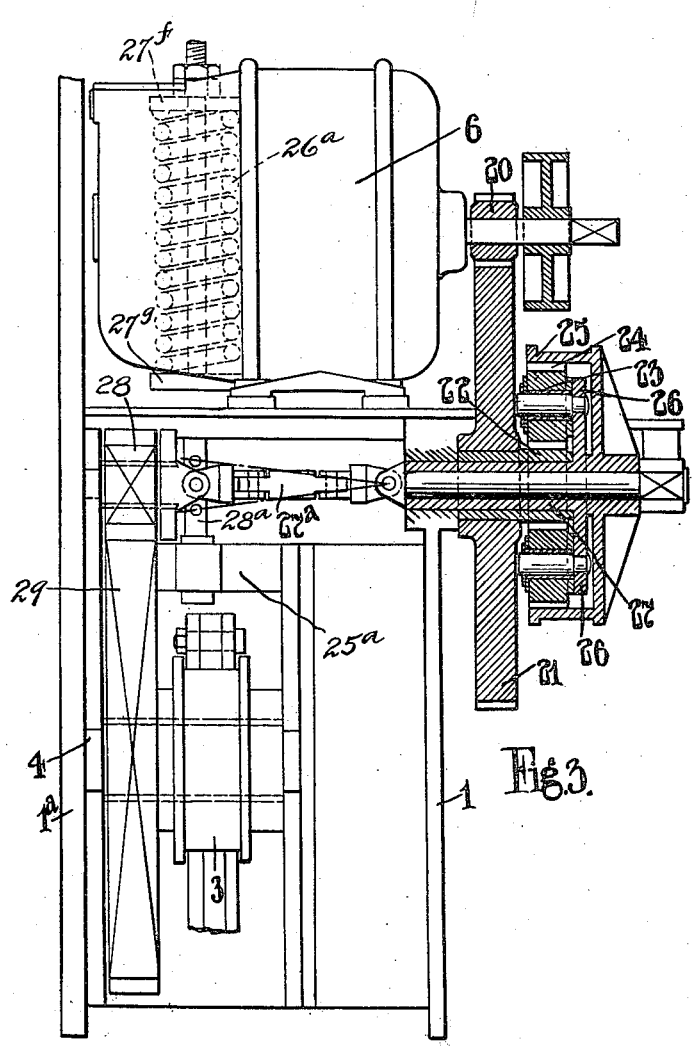

Nov. 6, 1923.                                                    1,472,977
                        W. HALLIWELL
WORK ROTATING GEAR ADAPTED FOR USE IN CONNECTION WITH HYDRAULIC
        PRESSES, STEAM HAMMERS, AND THE LIKE
              Filed Dec. 27, 1919         7 Sheets-Sheet 3
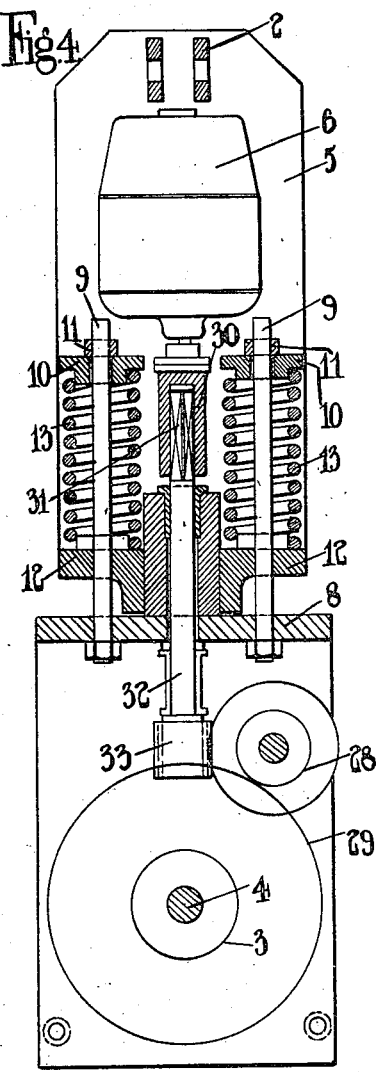
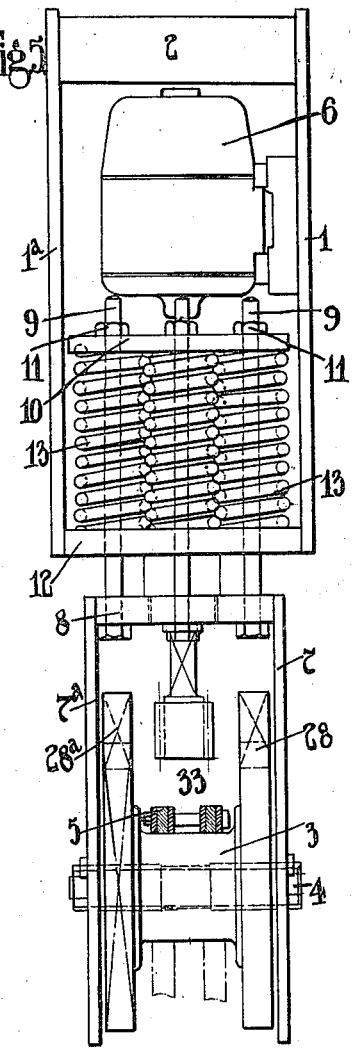
Inventor
W. Halliwell,
By H. R. Kerslake
    Attorney Nov. 6, 1923. 1,472,977
W. HALLIWELL
WORK ROTATING GEAR ADAPTED FOR USE IN CONNECTION WITH HYDRAULIC
PRESSES, STEAM HAMMERS, AND THE LIKE
Filed Dec. 27, 1919    7 Sheets-Sheet 4
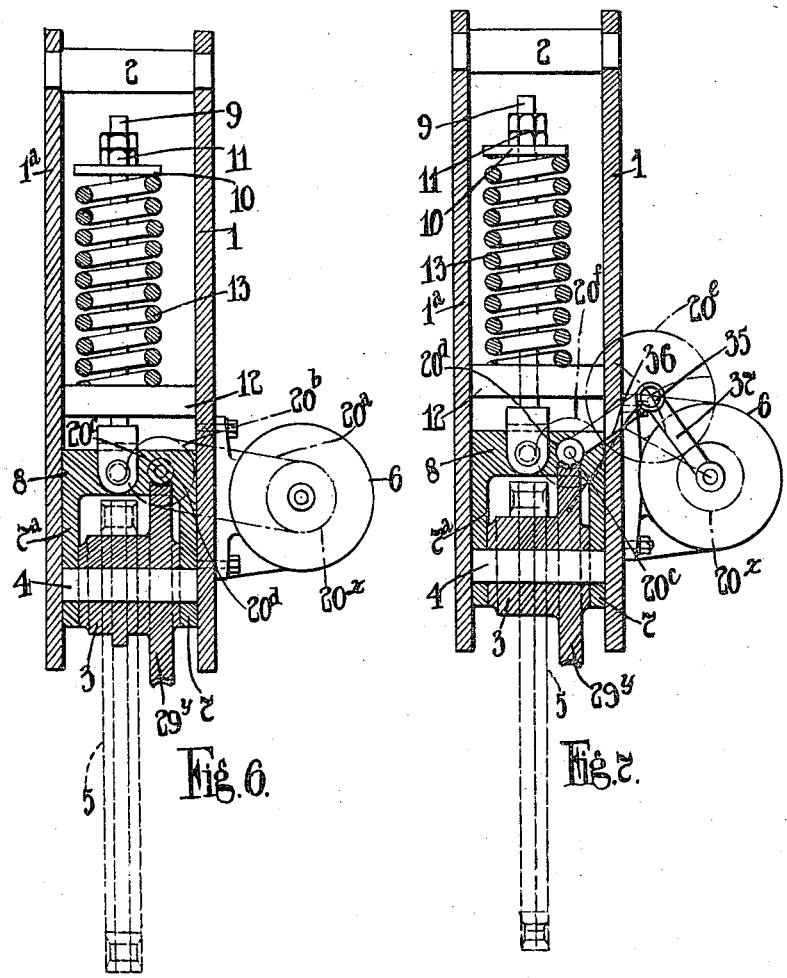
Inventor
W. Halliwell
By H. R. Kerslake
Attorney

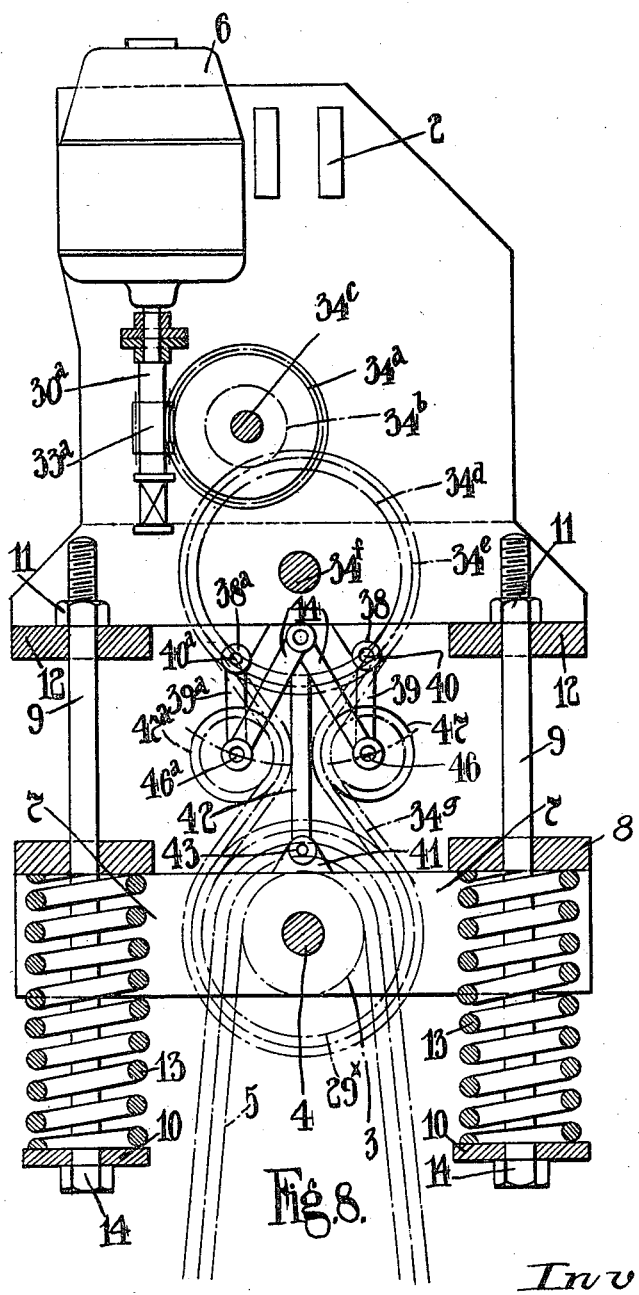

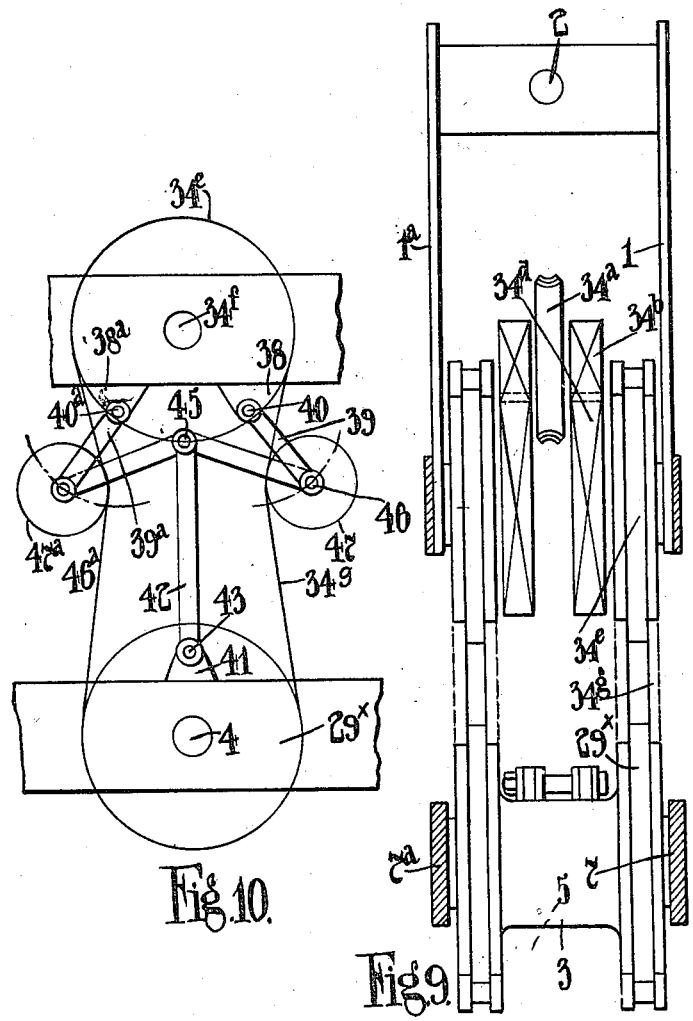

Patented Nov. 6, 1923.

1,472,977

UNITED STATES PATENT OFFICE.

WALTER HALLIWELL, OF HEATON CHAPEL, ENGLAND, ASSIGNOR TO SIR W. G. ARMSTRONG, WHITWORTH & COMPANY, LIMITED, OF NEWCASTLE-ON-TYNE, ENGLAND.

WORK-ROTATING GEAR ADAPTED FOR USE IN CONNECTION WITH HYDRAULIC PRESSES, STEAM HAMMERS, AND THE LIKE.

Application filed December 27, 1919. Serial No. 347,843.

*To all whom it may concern:*

Be it known that I, WALTER HALLIWELL, a subject of the King of Great Britain and Ireland, and residing at Brackley Road, Heaton Chapel, in the county of Lancaster, England, have invented certain new and useful improvements in and relating to work rotating gears adapted for use in connection with hydraulic presses, steam hammers, and the like, of which the following is a specification.

This invention relates to work rotating gears adapted for use in conjunction with hydraulic presses, steam hammers, and the like.

Work rotating gears of this kind are usually slung from the crane hook and consist of a suitable frame fitted with an electric motor driving through suitable reduction gear, a chain drum, usually provided with teeth about which an endless chain is arranged so as to provide a loop adapted to support the forging or the like which is to be operated upon by a press or steam or power hammer or like device; and in operation, the rotation imparted to the drum by the motor causes the chain to travel and thus effects the rotation of the body suspended in the loop of the chain. The rotation is required to be intermittent and to take place between the forging strokes, to which end hitherto it has been the general practice to provide between the motor and the chain drum a friction coupling capable of transmitting the full power of the motor, which is adapted to permit slipping when this power is exceeded.

In some cases, however, "slipping" is provided for by employing a smooth drum which is constantly rotated, the slip taking place between the chain and the drum but this construction is not satisfactory except perhaps in the case of small power gears dealing with forgings of regular shape.

As will be understood, the gear is subject to relatively considerable shocks when in use and to minimize the effects of such shocks, in certain instances, shock absorbers are provided between the point of suspension of the device and the electric motor. This arrangement, however, does not satisfactorily protect the motor or the driving train from the shocks to which the device is subjected, and it is the object of the present invention to provide a work rotating gear in which the harmful effects of such shocks shall be further reduced.

According to the invention shock absorbing devices are arranged between the motor and the point of suspension of the object which is being operated upon.

Thus, in accordance with the invention, the chain drum may be connected with the main frame of the gear through the intermediary of shock absorbing devices.

Alternatively, in accordance with the invention, the chain drum may be rigidly secured to the main frame of the work rotating gear and shock absorbing devices co-operating with the chain may be provided. Thus, in accordance with this method of carrying the invention into effect, jockey pulleys carried by suitable frames may be arranged to bear against the chain by means of springs in such manner that the frames will be caused to move in opposition to the action of the springs to cause the distance between the axis of rotation of the chain drum and the centre of the object being supported by the chain to be increased when the chain is subjected to abnormal stresses.

Certain embodiments of the invention are illustrated by way of example, in the accompanying drawings, in which:

Figures 1 and 2 are respectively a sectional elevation in a vertical plane at right angles to the axis of the chain drum and an end elevation of one construction in accordance with the invention;

Figure 3 is an end elevation of a second construction;

Figures 4 and 5 are respectively a cross section and elevation of a third construction;

Figure 6 is a sectional elevation of a fourth construction.

Figure 7 is a sectional elevation of a fifth construction;

Figure 8 is a side sectional elevation;
Figure 9 is an end sectional elevation of a sixth construction,
and
Figure 10 is a diagrammatic view of a portion of that construction, while

In the drawings:—

Figure 11:
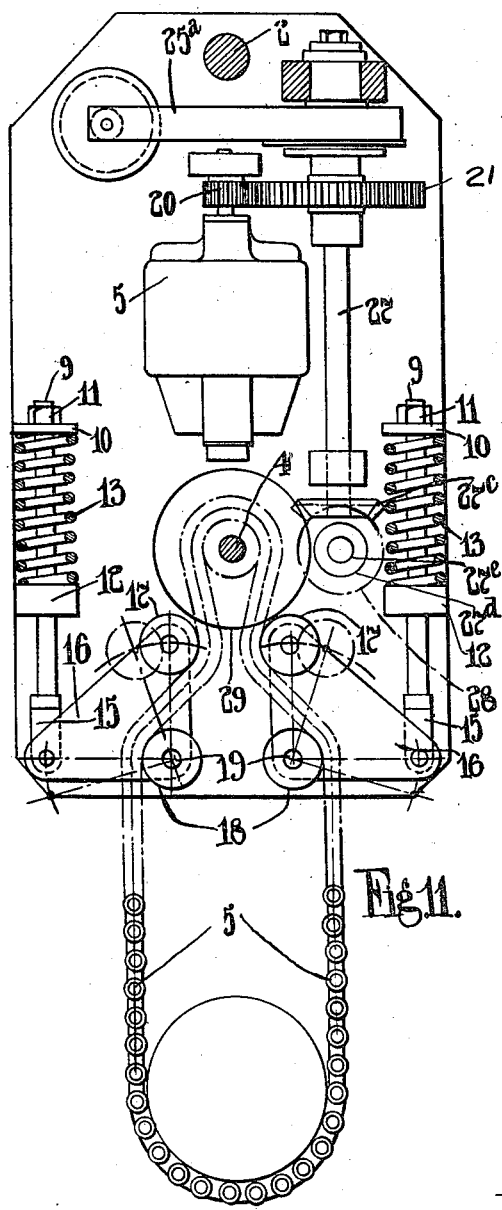
Figure 11 is a side sectional elevation of a seventh construction.

1 and 1ª are the main side plates, 2 the means by which the work rotating gear is suspended from the crane hook, 3 the chain drum, 4 the pin on which the chain drum is mounted, 5 the chain by which the forging is suspended, 6 the electric motor.

Referring to Figures 1, 2 and 4 to 10, 7 and 7ª are the side plates of the frame in which the pin 4 of the chain drum is secured. 8 the portion of the frame by means of which connection is made with the main frame, 9 are the rods by means of which the frame 7—8 is secured to the main frame. In the constructions illustrated by Figures 1 and 2 and 4 to 7, each of these rods 9 is connected at its lower end with the frame 7—7ª—8 and is provided with a plate 10 secured thereon by a nut 11 and between the plate 10 and a cross piece 12, a helical spring 13 is arranged.

In the construction illustrated by Figures 8 to 10, the plate 10 is arranged against heads 14, formed on each of the rods 9 and the springs 13 are interposed between these plates and the portion 8 of the frame in which the pin of the chain drum is mounted, the rods 9 passing through holes in the cross piece 12 of the main frame and being held in the desired position in relation thereto by the nuts 11. As will be observed the frame in which the pin 4 of the chain drum 3 is arranged in the constructions illustrated by Figures 1 to 3, 6 and 7 slides between guiding surfaces provided on the side plates of the main frame, while in the constructions illustrated by Figures 4, 5, 8, 9 and 10, the frame in which the pin 4 of the chain drum is mounted is not so guided. In the construction illustrated by Figure 11, the pin 4 of the chain drum 3 is secured in the main frame plates, while the rods 9 provided with plates 10 and nuts 11 pass through helical springs 13 which are confined between the plates 10 and the cross pieces 12 of the main frame, and are secured at their lower ends 15 to the triangular frames 16 which carry idlers 17 and 18, the pin 19 of the latter being mounted in holes provided in the main frame so that each of the triangular frames 16 may pivot about the axis of the pin by which it is secured to the main frame. When the object supported by a work rotating gear of this construction is subjected to a shock, the triangular frames 16 will be caused to pivot about their axes against the action of the springs 13, taking up for instance, the position shown in dotted lines in Figure 11, such motion of the frames serving to absorb the shock. In the constructions illustrated by Figures 1, 2, 3 and 11, the motor 6 drives, by means of the pinion 20, the wheel 21 forming part of an epicyclic gear. As shown in Figures 1 and 3, the wheel 21 drives the sun wheel 22, which in turn drives the planet wheels 23 which mesh with the internal teeth 24 provided on the drum 25 with the external surface of which the brake device 25ª co-operates, the pins on which the planet wheels 23 are mounted being secured to the carrier 26 mounted on the shaft 27. In the construction shown in Figure 3, the shaft 27 is connected through the intermediary of the flexible coupling shaft 27ª with the wheel 28, meshing with the wheel 29 secured to the chain drum. The shock absorbing means in form shown in Fig. 3 consists in the arrangement of a plate 25ª between the side plates 1 and 1ª and the arrangement of a spring 26ª between the washers 27ᶠ and 27ᵍ which together with the spring are arranged on the rod 28ª. In the construction shown in Figures 1 and 2, the shaft 27 is provided with a squared end 27ᵇ on which the bevel pinion 27ᶜ is slidably mounted so that the motion of the frame 7—7ª—8 in a downward direction will cause the bevel pinion to move in a similar manner and to remain in engagement with the bevel wheel 27ᵈ mounted on the shaft 27ᵉ on which also the pinion 28 meshing with the wheel 29 secured to the chain drum is mounted.

In the construction shown in Figure 11, except for the fact that the squared end 27ᵇ of the shaft 27 is absent the method of transmitting power to the wheel 29 is precisely similar to that employed in the construction shown in Figures 1 and 2.

In the construction shown in Figures 4 and 5, the armature or rotor shaft of the motor is provided with a sleeve 30 having a square sectioned hole which engages the squared end 31 of the spindle 32 on which a worm 33 is mounted. This worm meshes with the worm wheel 34 mounted on the shaft 27ᵉ on which the pinions 28—28ª driving wheels 29—29ª secured to the chain drum, are mounted. In the construction shown in Figure 6, the sprocket 20 mounted on the motor shaft drives through the chain 20ª, the wheel 20ᵇ mounted on the shaft 20ᶜ on which also a worm 20ᵈ is mounted; this worm operates the worm wheel 29ʸ secured to the chain drum.

In the construction shown in Figure 7, the wheel 20 mounted on the motor shaft is a spur pinion and this drives through a wheel 20ᵉ the pinion 20ᶠ mounted on the shaft 20ᶜ on which also the worm 20ᵈ operating the worm wheel 29ʸ is mounted. The wheel 20ᵉ is mounted on a pin 35 which is connected by means of links 36 and 37 with the motor shaft and with the shaft 20ᶜ, so that the motion of the latter in consequence of the motion of the frame 7—7ª—8 causes the wheel 20ᵉ to move in such manner as to maintain the driving connection between the motor and the chain drum.

In the construction illustrated by Figures 8 to 10, the armature or rotor shaft of the motor is provided with a prolongation 30ª on which a worm 33ª is mounted. This worm engages a worm wheel 34ª which with the pinion 34ᵇ is mounted on the shaft 34ᶜ. The pinion 34ᵇ meshes with the wheels 34ᵈ which together with the sprockets 34ᵉ are mounted on the shaft 34ᶠ, these sprockets drive through the intermediary of chains 34ᵍ the chain sprockets 29 secured to the chain drum 3. Lugs 38—38ª are formed on the side plates 1 and 1ª and to these lugs, links 39—39ª are pivotally connected by pins 40—40ª. Lugs 41 are formed on the side plates 7 and 7ª and to these lugs links 42 are pivotally connected by pins 43. To the other ends of these links 42 the links 44 and 44ª are secured by pins 45. The links 39 and 44 and 39ª and 44ª respectively are secured together by pins 46 and 46ª which also serve as spindles for the rollers 47 and 47ª. The function of this arrangement of links and rollers is to maintain the desired tension on the chains 34 to enable them to transmit power from the driving to the driven sprockets and to permit the latter to move away from the former.

While in the above detailed description reference is made to electric motors, it is to be understood that the employment of other suitable motor elements or sources of power falls within the scope of the present invention.

Having now described my invention what I claim as new and desire to secure by Letters Patent is:—

1. A work rotating gear adapted for use in conjunction with hydraulic presses, steam hammers and the like, comprising a main frame, means whereby the main frame may be suspended from a crane hook, an electric motor secured in fixed relationship with the main frame, a chain drum permanently associated with the frame, a chain sling mounted on the chain drum, motion transmitting means between the electric motor and the chain drum and shock absorbing devices between the electric motor and the lower end of the chain sling.

2. A work rotating gear adapted for use in conjunction with hydraulic presses, steam hammers and the like, comprising a main frame, means whereby the main frame may be suspended from a crane hook, an electric motor secured in fixed relationship with the main frame, a chain drum permanently associated with the frame, a chain sling mounted on the chain drum, motion transmitting means between the electric motor and the chain drum and means adapted to prevent the transmission to the motor of shocks to which the chain sling is subjected.

3. A work rotating gear adapted for use in conjunction with hydraulic presses, steam hammers and the like, comprising a main frame, means whereby the main frame may be suspended from a crane hook, an electric motor secured in fixed relationship with the main frame, a chain drum, a chain sling mounted on the chain drum, motion transmitting means between the electric motor and the chain drum, frames pivotally mounted on the main frame, idler wheels pivoted to the pivotally mounted frames, and springs operating on said frames to cause the idler wheels to operate against the chain and provide slack therein adapted to be taken up when the chain is subjected to stresses.

In testimony whereof I have signed my name to this specification.

WALTER HALLIWELL.